United States Patent
Litmer

(10) Patent No.: US 6,286,964 B1
(45) Date of Patent: *Sep. 11, 2001

(54) MIRROR COVER

(76) Inventor: Paul L. Litmer, P.O. Box 122, Woodburn, IN (US) 46797

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,812
(22) Filed: Mar. 3, 1999
(51) Int. Cl.[7] .............. G03B 11/04; B65D 65/02
(52) U.S. Cl. .............. 359/511; 359/507; 150/154
(58) Field of Search ................ 359/511, 507; 150/166, 154

(56) References Cited

U.S. PATENT DOCUMENTS

| 5,115,848 | * | 5/1992 | Malone ................ 359/511 |
| 5,443,086 | * | 8/1995 | Muller ................ 150/154 |
| 5,915,399 | * | 6/1999 | Yang ................ 135/88.01 |
| 5,922,437 | * | 7/1999 | Bryant ................ 150/154 |
| 5,984,172 | * | 11/1999 | Easterwood ................ 150/154 |

* cited by examiner

Primary Examiner—Cassandra Spyrou
Assistant Examiner—Jennifer Winstedt
(74) Attorney, Agent, or Firm—Krieg DeVault Lundy LLP

(57) ABSTRACT

A cover for tripod base fender mounted truck mirrors of flexible material having a closed end and an open end. The closed end and the open end are about the size of the tripod base. The open end and closed end are spaced apart by generally straight sides. The sides are longer than the ends when the cover is collapsed flat. The sides are generally parallel. The cover adjacent the open end is selectively expandable to encompass tripod bases of several different sizes.

14 Claims, 6 Drawing Sheets

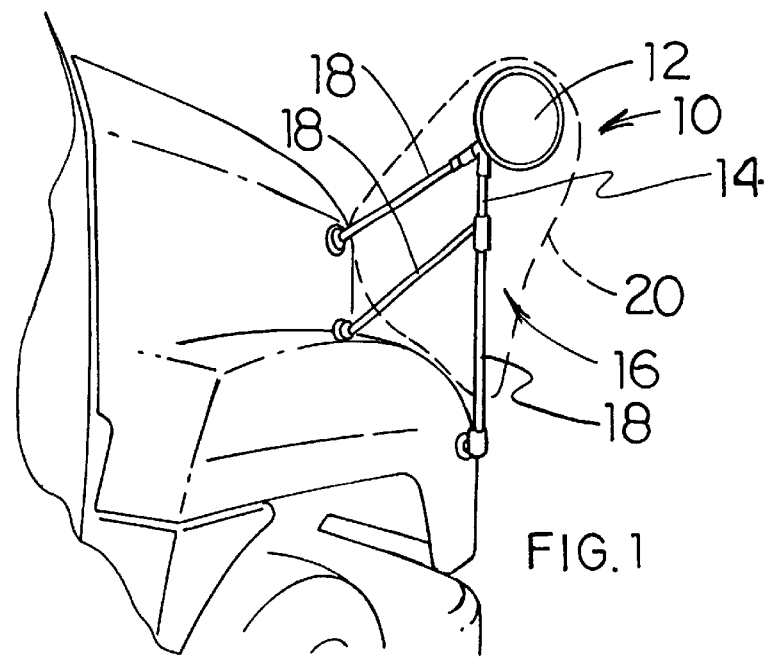
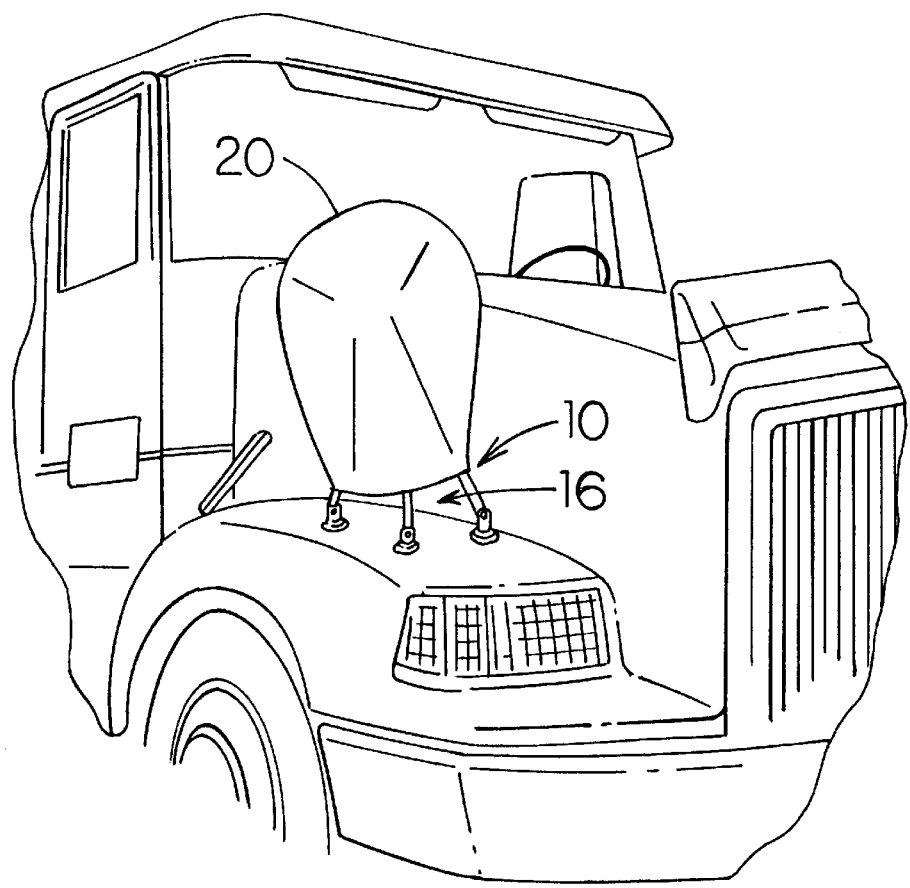
FIG. 2

MIRROR COVER

The present invention relates to truck mirrors and more particularly to a cover for truck mirrors to both protect the mirror and make them more noticeable so that people walking by the truck will avoid them.

Truck mirrors are now available in a variety of shapes and sizes. The currently available truck mirrors may be categorized interior mounted truck mirrors, exterior mounted side truck mirrors and exterior fender mounted mirrors.

Exterior fender mounted mirrors have a tripod base with a mirror mounted at the apex of the base. The legs of the base are moveable toward and away from each other and are extendible and collapsible as desired to accommodate different truck configurations and yet position the apex of the mirror where desired. Thus, when such mirrors are mounted on different trucks, the tripod base of the mirror may have different circumferencial sizes and different heights from the fender depending upon the truck configuration. Furthermore, individual truck drivers like these mirrors positioned differently. Thus, most of these mirrors present a rather unique protrusion of different sizes and shapes extending from the truck.

These tripod fender mounted mirrors often present a hazard to persons walking around trucks as they protrude from the truck to present a not-too-noticeable obstruction that to date many people have unknowingly walked into or otherwise collided with resulting in breakage of the mirror, bending or otherwise destroying the tripod and/or causing personal injury. It is therefore highly desirable to provide a new and improved cover for these mirrors to both protect the mirror and to make them more noticeable thereby to avoid persons from colliding with them. It is also highly desirable to provide one such cover which will fit all tripod base fender mounted truck mirrors of all sizes no matter how mounted on a variety of truck configurations. It is also highly desirable to provide a new and improved cover for tripod base fender mounted truck mirrors which is colored OSHA red or yellow.

Such tripod base fender mounted truck mirrors present an unusual problem when mounted on a truck cab of the type which is pivotally mounted to the chassis such that the entire cab may be rotated forward to expose the engine for maintenance. These mirrors when the cab is rotated forward for maintenance present an unusual hazard in that they protrude from the truck about neck high of a average adult human being walking by the truck. Further, in this position the mirrors do not extend from the truck vertically as when the cab is in operating position, but extend from the truck generally horizontally. Therefore, it is highly desirable to provide a new and improved cover for tripod base fender mounted truck mirrors which will not fall off the mirror when a truck cab is in maintenance position.

Truckers and maintenance personnel are both known to be very selective as to what truck accessories and equipment they use. Their selectiveness has often been totally aesthetic in nature, totally practical or convenient in nature or a combination of the two. It is therefore highly desirable to provide a new and improved cover for tripod base fender mounted truck mirrors which is aesthetically pleasing to encourage use. It is also highly desirable to provide a new and improved cover for tripod base fender mounted truck mirrors which are convenient to use. It is also highly desirable to provide a new and improved cover for tripod base fender mounted truck mirrors which can be relatively inexpensively manufactured.

Finally, it is highly desirable to provide a new and improved cover for tripod base fender mounted truck mirrors of all kinds, types and sizes which have all of the above features.

SUMMARY OF THE INVENTION

It is therefore an object of the invention to provide a new and improved cover for these mirrors to both protect the mirror and to make them more noticeable thereby to avoid persons from colliding with them.

It is also an object of the invention to provide one such cover which will fit all tripod base fender mounted truck mirrors of all sizes no matter how mounted on a variety of truck configurations.

It is also an object of the invention to provide a new and improved cover for tripod base fender mounted truck mirrors which is colored OSHA red or yellow.

It is also an object of the invention to provide a new and improved cover for tripod base fender mounted truck mirrors which will not fall off the mirror when a truck cab is in maintenance position.

It is also an object of the invention to provide a new and improved cover for tripod base fender mounted truck mirrors which is aesthetically pleasing to encourage use.

It is also an object of the invention to provide a new and improved cover for tripod base fender mounted truck mirrors which are convenient to use.

It is also an object of the invention to provide a new and improved cover for tripod base fender mounted truck mirrors which can be relatively inexpensively manufactured.

Finally, it is an object of the invention to provide a new and improved cover for tripod base fender mounted truck mirrors of all kinds, types and sizes which have all of the above features.

In the broader aspects of the invention there is provided a cover for tripod base fender mounted truck mirrors of flexible material having a closed end and an open end. The closed end and the open end are about the size of the tripod base. The open end and closed end are spaced apart by generally straight sides. The sides are longer than the ends when the cover is collapsed flat. The sides are generally parallel. The cover adjacent the open end is selectively expandable to encompass tripod bases of several different sizes.

DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 1 is a fragmentary perspective view of the side of the truck showing a tripod base fender mounted rear view truck mirror having a relatively large tripod base and the mirror cover of the invention on the mirror in dashed lines;

FIG. 2 is a fragmentary perspective view of a truck cab showing a tripod base fender mounted mirror having a relatively small tripod base and the mirror cover of the invention mounted thereon;

DESCRIPTION OF A SPECIFIC EMBODIMENT

Figure 3:
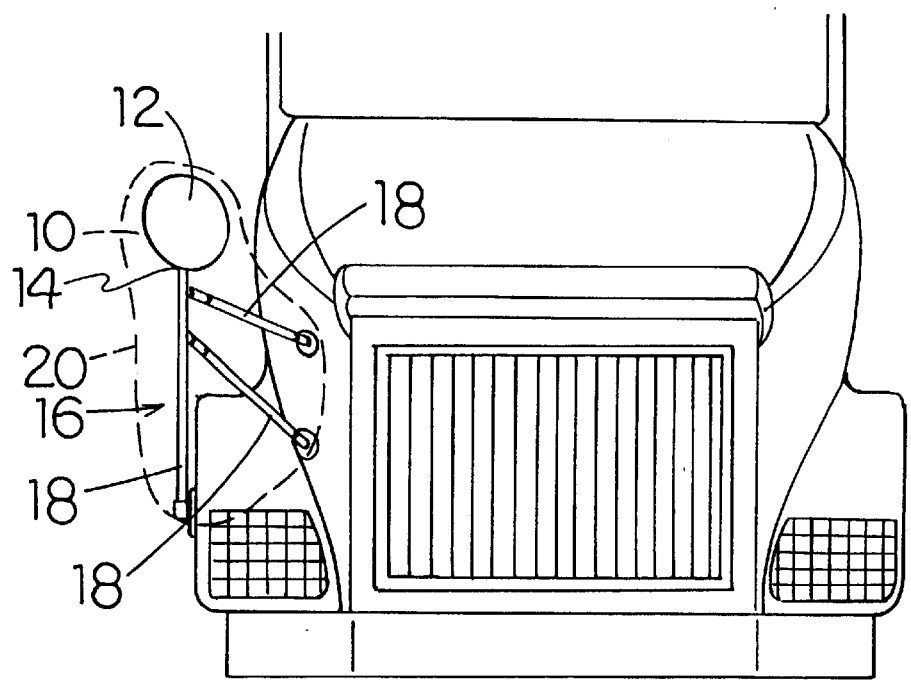
FIG. 3 is a front planar view of a truck cab showing the extension of the tripod base fender mounted truck mirror shown in FIG. 1 from the truck.

Referring to FIGS. 1 through 3, there are shown truck mirrors 10 of the type with which the new and improved mirror covers 20 of the invention is used are illustrated. These truck mirrors 10 are fender mounted and extend from the truck cabs a sufficient distance to allow the driver of the truck to view that which is following the truck on the road and along the side of the truck that the mirror is mounted on. Thus, each of these mirrors must extend from the cab a distance greater than the extension of the trailer from the truck cab.

These trucks typically have a mirror 12 mounted on a pedestal 14 which extends upwardly and outwardly of the truck from a tripod base 16 having three legs 18. Each of the legs 18 are secured at various positions either to another leg 18 or to the pedestal 14 and each is extendible in length as desired and each is movable about the longitudinal axis of the pedestal 14 to extend from the pedestal 14 in any position 360° thereabout as desired.

Legs 18 may be moved relative to the axis of pedestal 14 and extended in length differently toward the mounting of the mirror on each different truck design. In all mountings of the truck mirror 10, the mirror 12 is positioned at about the same position with regard to the position that the truck driver is positioned in the cab. Generally, this position is outward bound of the trailer attached to the truck cab at a height which is about the height of the lower window ledge of the cab. See FIG. 3.

Thus, as it is shown in FIGS. 1 and 2, these mirrors 10, 60 mounted to different truck cabs may have different heights from the fender and may have bases 16, 62 of different circumferential dimensions taken essentially perpendicular to the axis of the pedestal 14. Additionally, individual truck drivers may like these mirrors 16, 62 positioned differently. Thus, each of these mirrors presents a rather unique protrusion of different size and shape extending from the truck cab.

Mirror 12 is mounted to a truck cab by securing the legs 18 to the cab at various positions. As shown in FIG. 1, one leg 18 may be secured to the horizontal vertically extending part of the hood, another leg 18 may be secured to the side or generally vertical part of the fender, and another leg 18 may be secured to the generally vertically upstanding portion of the hood between the two other spaced apart legs 18. See FIGS. 1, 3 and 4. With this type of mounting, it is possible that the circumference of the base of the tripod base 16, in a specific embodiment, has a diameter of several feet. Alternatively, as shown in FIG. 2, all three of the legs 18 may be secured to the top generally horizontal surface of a fender, forward and aft, and a third leg surface may be secured to the generally vertical upstanding side surface of the fender. In this instance, the tripod base 12 may have an overall circumference at the base in which the diameter is less than one foot. Thus, when mounted from truck to truck mirrors 10 have greatly varying differences in size of bases 16, 62, heights from the fender due to the spreading and elongation of legs 18 to adapt the mirror to a specific truck and each 16, 62 presents a different problem to manufacturers of mirror covers.

Figure 4:
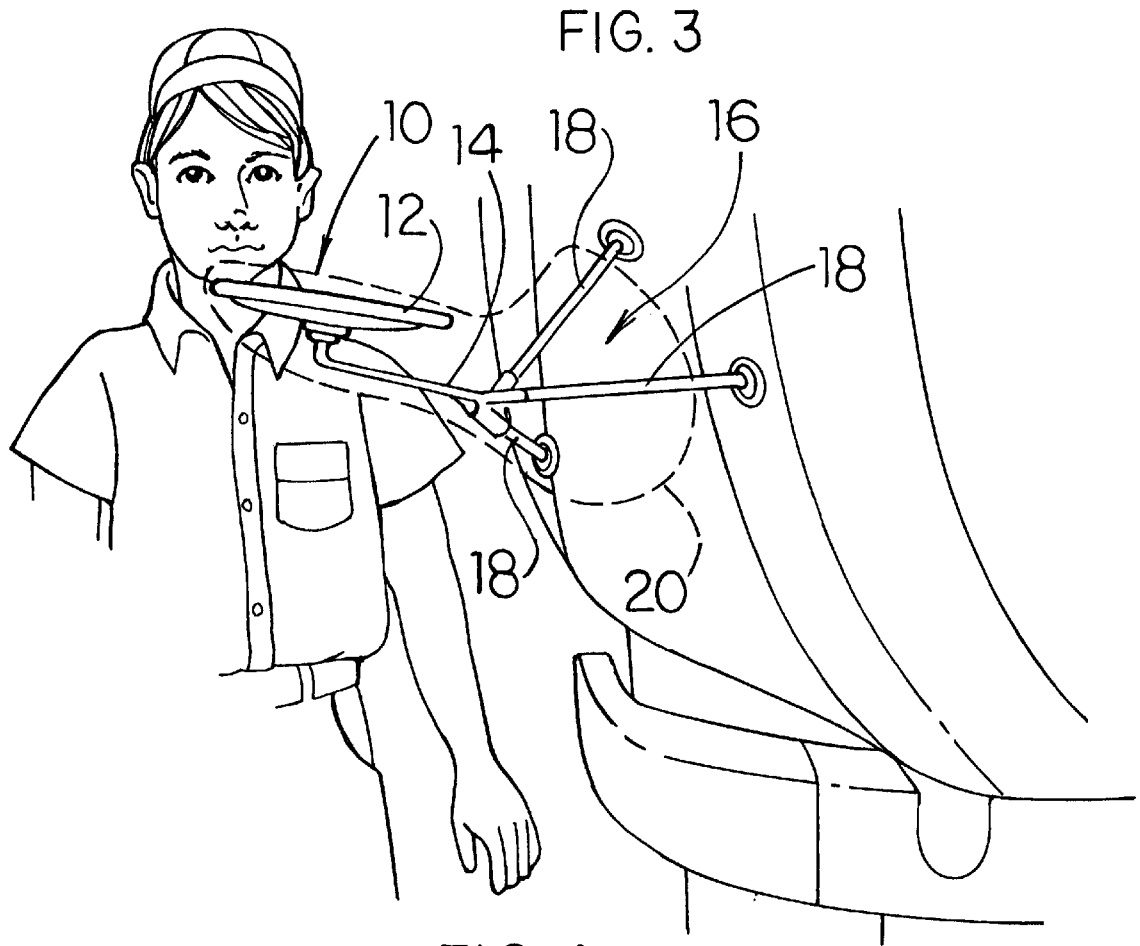
FIG. 4 is a fragmentary perspective view of the tripod base fender mounted truck mirror shown in FIG. 1 on a truck of a cab forward design pivoted forwardly into its maintenance position illustrating the extent of the protrusion and general height of the protrusion of the mirror.

Each of the mirrors 10 also often present varying hazards to persons walking around the trucks as they protrude from the truck to present a not-too-noticeable obstruction that to date many people have unknowingly walked into or otherwise collided with resulting in the breakage of the mirror, bending or otherwise destroying the tripod or causing personal injury. In FIG. 4 there is shown a truck cab having a mirror mounted thereon as heretofore described of the "cab forward" design as shown in FIG. 1 which, during maintenance, the cab body is pivoted forward to expose the engine, transmission and portions of the chassis. When the cab body is rotated forward as shown, these mirrors present an unusual obstruction inasmuch as they extend from the cab at a level which is approximately head high to most persons walking by the truck cab. Further, in this position as shown the mirrors 10 extends generally horizontally from the truck cab and therefore present a unique hazard which is difficult to avoid unless appropriate warning is made.

Figure 5:
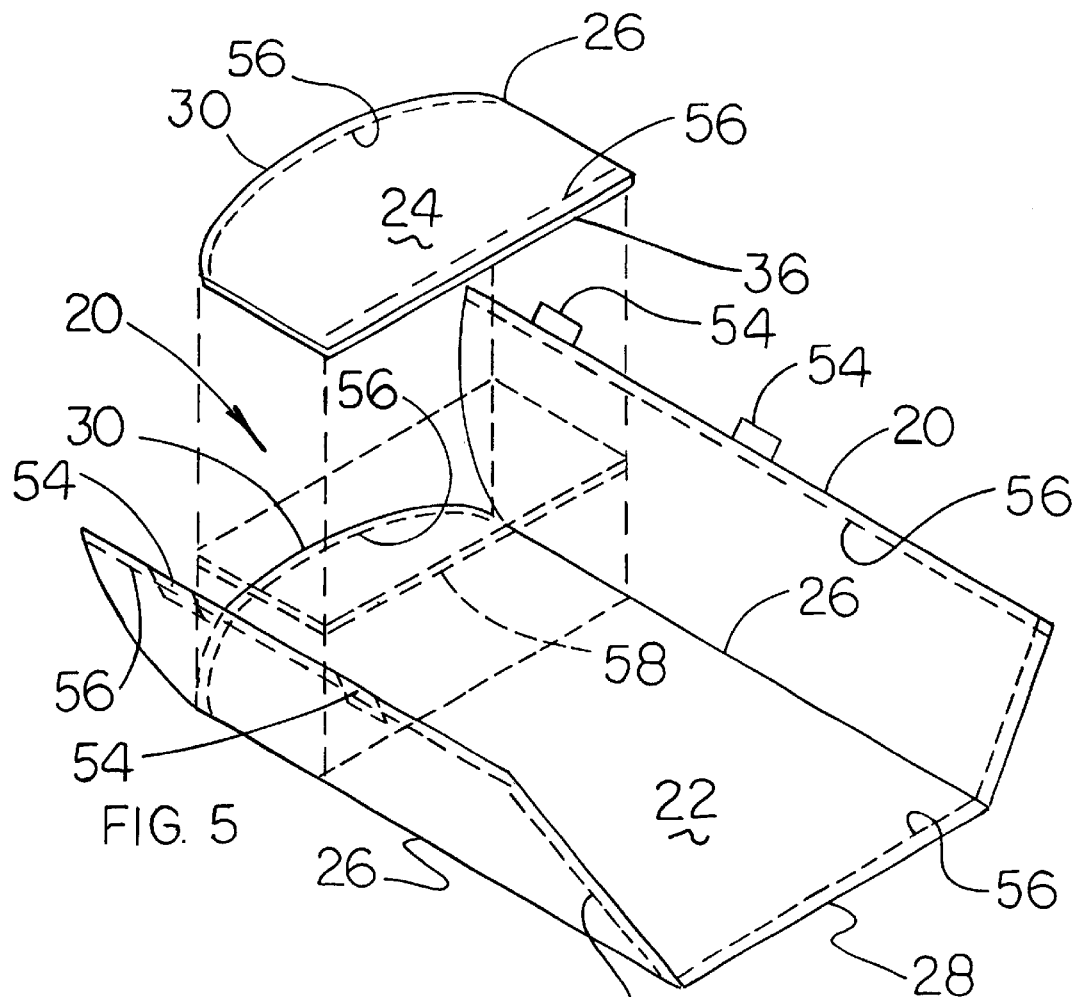
FIG. 5 is an exploded perspective view of the two members of the cover of the invention.

Referring to FIG. 5, the new and improved mirror cover 20 is shown in an exploded perspective view. FIG. 5 is essentially a pattern from which the individual pieces 22 and 24 are cut from sheets of flexible material. Mirror cover piece 22 comprises an entire side of the mirror cover of the invention and is elongated having generally spaced apart and generally parallel sides 26, a flat end 28 extending between sides 26 and a spaced apart remote curved end 30. Curved end 30 also extends between sides 26. Piece 22 has a distance (d) between ends 28 and 30 which is a little bit shorter than the longitudinal length (l) of the mirror as shown in FIG. 1. Additionally, the distance (w) between sides 26 is generally a little bit larger than the diameter of the circumference of the largest extension of the legs 18 of the tripod base 16 as shown in FIG. 1. Piece 24 of the cover 20 of the invention is about one half of one side of the piece 22 previously described to include a curved end 30. Thus, piece 24 also has opposite generally straight sides 26 which extend generally parallel to each other and opposite flat end 36. The combination of pieces 22 and 24 have the same dimensions (d) and (w) as piece 22. See FIG. 6.

Figure 6:
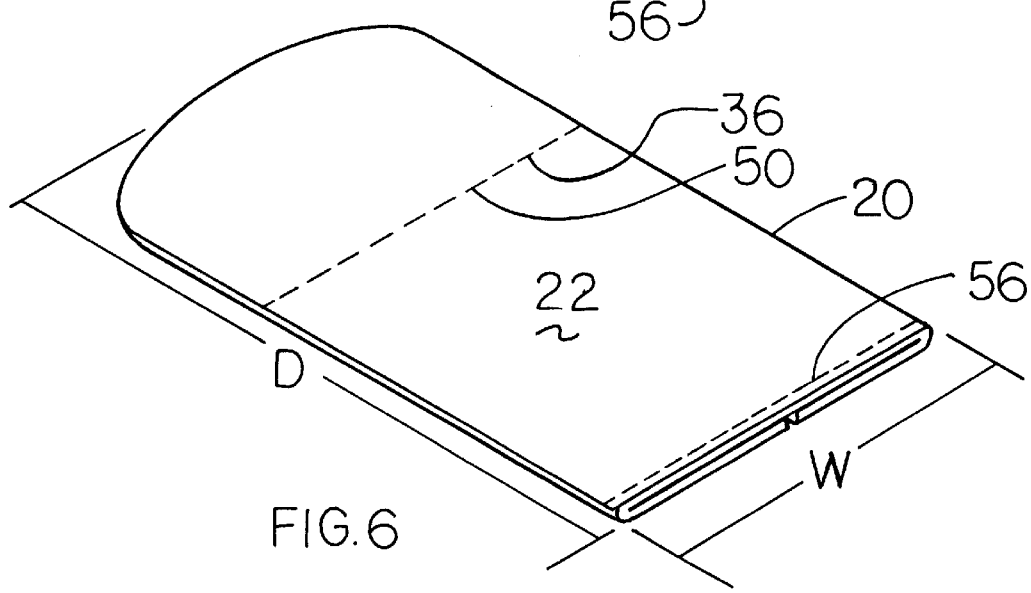
FIG. 6 is a perspective view of the non-slit side of the cover of the invention.

As shown in FIG. 6, the pieces 22 and piece 24 are stitched together to form the back of the cover 20 of the invention. The back of the cover 20 of the invention has a seam 50 extending transversally across the back approximately half way between the opposite ends 28, 30.

Figure 7:
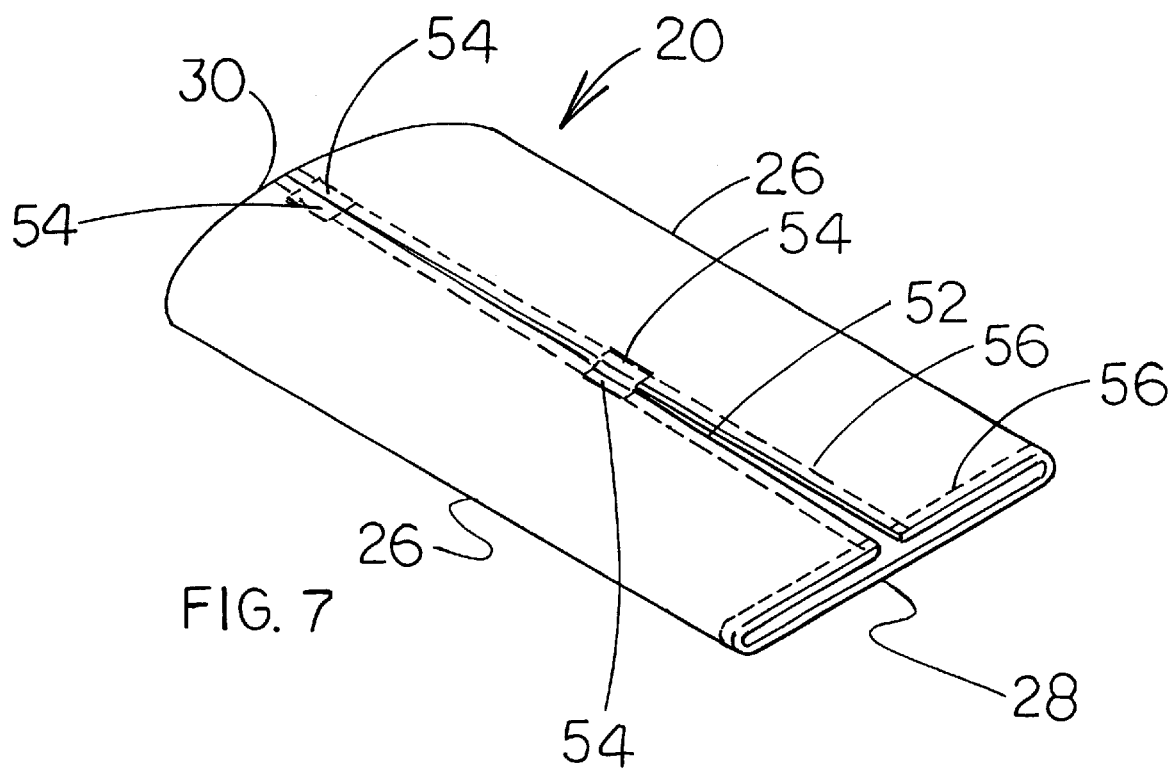
FIG. 7 is a perspective view of the slit side of the cover of the invention showing the spaced apart slit closures.
Figure 8:
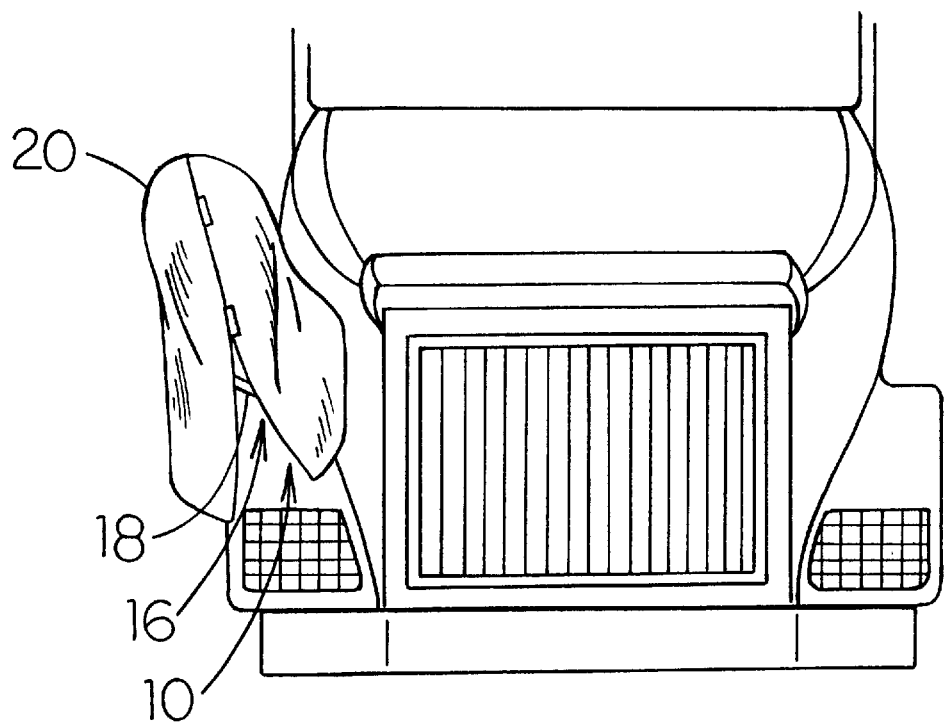
FIG. 8 is a front planar view of the truck cab like FIG. 3 showing the extension of the tripod base fender mounted truck mirror shown in FIG. 1 from the truck and the mirror cover of the invention in full lines with the slit facing the viewer.
Figure 9:
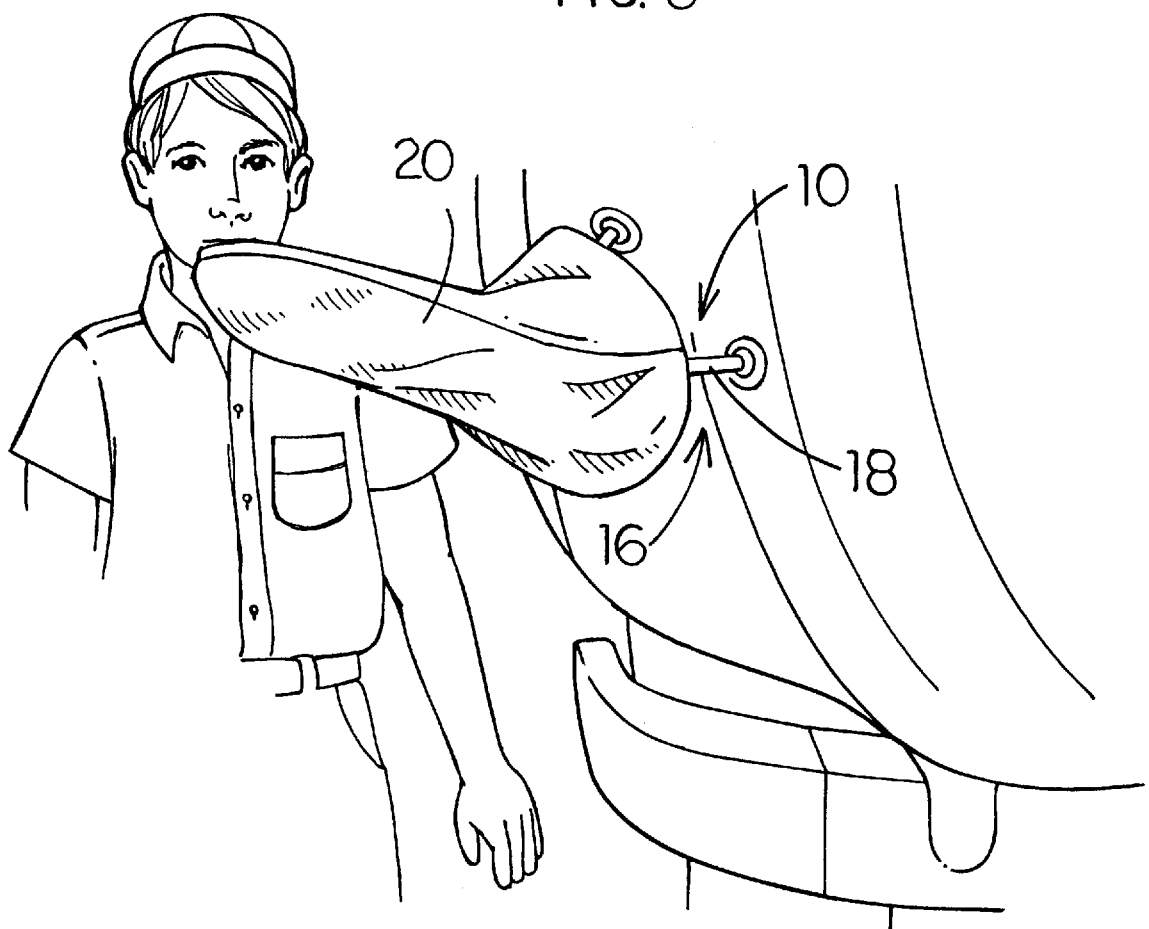
FIG. 9 is a fragmentary perspective view like FIG. 4 of the tripod base fender mounted truck mirror shown in FIG. 1 on a truck of a cab forward design pivoted forwardly into its maintenance position illustrating the extent of the protrusion and general height of the protrusion of the mirror and showing the mirror cover in full lines with the slit facing opposite the viewer.
Figure 10:
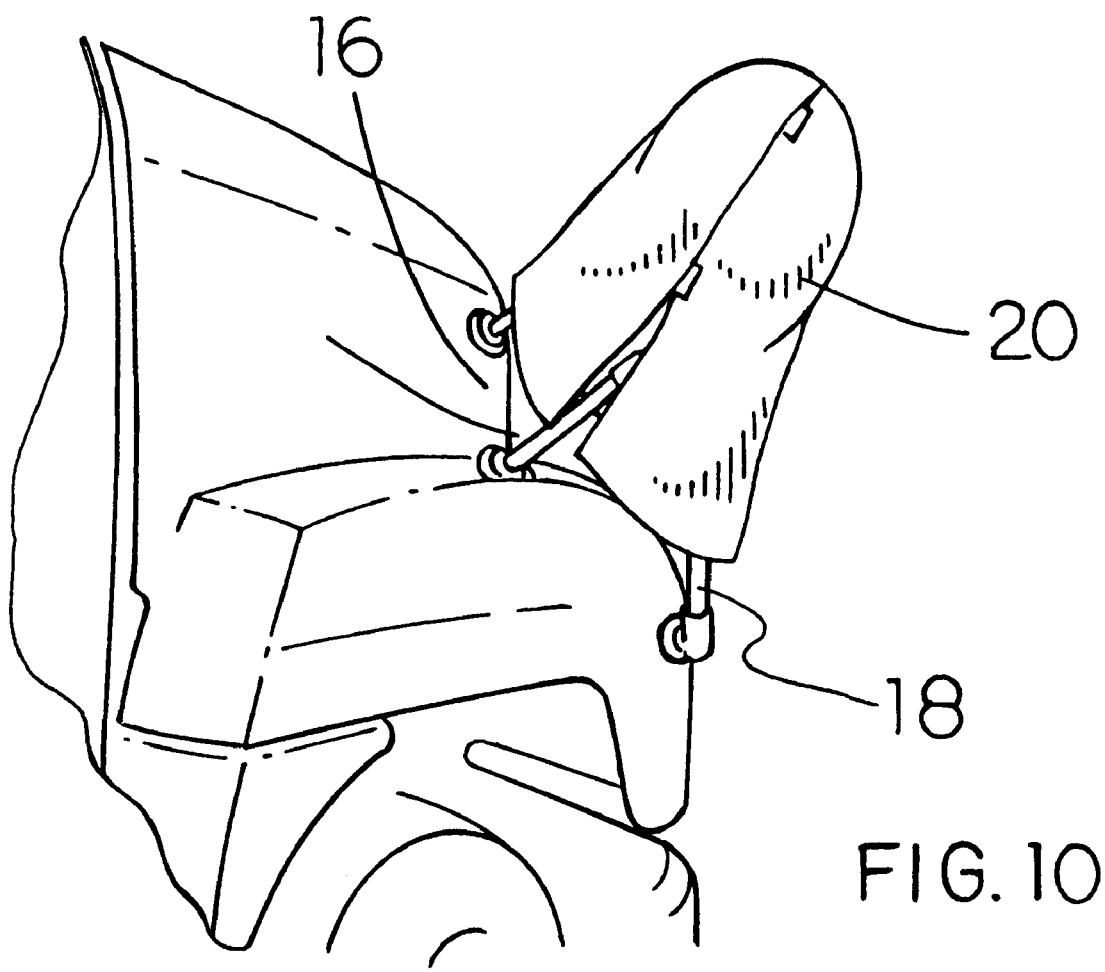
FIG. 10 is a fragmentary perspective view like FIG. 1 of the side of the truck showing a tripod base fender mounted rear view truck mirror having a relatively large tripod base and the mirror cover on the mirror of the invention in full lines with the slit facing the viewer.

The front of cover 20 has a slit 52 extending from end 28 to the end 30. Positioned on the slit 52 is a plurality of equally spaced apart VELCRO fasteners 54 as shown. As shown in FIG. 7, the piece 22 has stitching 56 at its periphery and at seam 50 as shown in FIGS. 6 and 7 by dashed lines. In the specific embodiment illustrated, the peripheral portions of each of the pieces at the seams are bent inwardly and the stitching is positioned inside the cover 20.

In a specific embodiment, the pieces 22, 24 are cut from highly durable fabric material having an OSHA approved color. The fabric in a specific embodiment is moisture proof and highly durable. In a specific embodiment, the specific material utilized is coverlight vinyl fabric. In a specific embodiment, the thread used for the stitching 56 is chosen from the group of threads consisting of 18 to 20 pound (breaking strength) DACRON thread.

The word "generally" is used to modify the terms "generally parallel" and generally straight" with regard to opposite sided 26 and the like. The word "generally" is used herein to refer to straight sides and parallel sides such as shown in the drawings. As the drawings are not to scale, the description of the sides 26 and the use of the word "generally" refers to the straight sides 26 and parallel sides 26 within the tolerances of a seamstress when cutting the patterns for the new and improved mirror cover 10 of the invention as illustrated in FIGS. 5–7 from sheet material.

In operation, fasteners 54 may be chosen from the group of fasteners consisting of hooks, VELCRO fasteners, snaps, zippers, ties, buttons and other appropriate fasteners. In operation, the mirror cover 20 of the invention is utilized to cover, encapsulate, and render obvious of the existence of a mirror to anyone walking by the truck when in use. The mirror cover extends over the mirror 10, 60 with mirror 12 engaging end 28 with end 30 being spaced apart from the truck. The cover 20 at end 30 encapsulates the tripod pedestal 16, 62 no matter how spread apart or close together legs 18 may be in the particular truck installation.

The mirror cover 20 is removably secured to the mirror 10 such that it will not be unintentionally become dislodged from the mirror 10 by the connectors 54 which snugly close the slot 52 and pull the mirror cover adjacent end 30 around the pedestal 16.

Slit 52 allows the cover 20 adjacent end 28 to expand to encompass tripod bases 16, 62 and a number of other tripod bases as may be experienced when a mirror is secured to a truck as illustrated in FIGS. 1–4. The diameter of the tripod bases 16, 62 may extend from several feet to less than on foot. Slit 52 allows the new and improved cover 20 of the invention to accommodate all such bases.

The purpose of the mirror cover 20 is two-fold. The first purpose is to protect the mirror 10 from breakage upon impact. This is accomplished by padding provided by the two pieces 22, 24, one overlaying the other or providing a piece of padding 58 which has the same shape and size of pieces 22, 24 stitched between or with pieces 22, 24. One of these alternatives is utilized in each of the cover 20 to protect the mirror 10.

Two pieces 22, 24 one overlaying the other or two pieces 22, 24 with a piece of padding 58 positioned therebetween renders the half of the mirror cover of the invention adjacent closed end 30 appreciably stiffer and less flexible than the mirror cover 20 adjacent open end 28. This feature allows the mirror cover 20 to be positioned on both large and small mirrors and to be retained thereon by gravitational forces. When the mirror has a height larger than the distance between ends 28 and 30, the mirror cover the invention will hang on the mirror.

The other purpose the mirror cover 20 of the invention accomplishes is to warn all persons adjacent the mirror of its presence such that those persons can avoid impacting the mirror and thereby avoid damage to the mirror 10, its pedestal 16, 14 and personal injury. This is accomplished by providing the mirror cover 20 in OSHA approved colors.

The new and improved mirror cover of the invention provides both protection to the mirror and to those persons walking around trucks having such mirrors. The new and improved mirror cover of the invention will fit all tripod based fender mounted truck mirrors of all sizes, no matter how mounted on a variety of truck configurations, will not fall off the mirror when the truck cab is in various maintenance positions, is aesthetically pleasing to use, is convenient to use, and can be provided and manufactured relatively inexpensively.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A cover for truck mirrors mounted on tripods having various sizes; said tripods being larger than the mirrors mounted thereon; said cover comprising: means for covering said truck mirrors mounted on said tripods; wherein said means for covering includes a cover of flexible material which is not resiliently stretchable; said cover having a closed end and an opposite open end spaced apart by generally parallel straight sides; said ends and sides defining an interior area of said cover; and a slit in said cover extending from said open end toward said closed end; and, closures secured to said cover at a plurality of spaced apart locations along said slit; whereby, the various sizes of said tripods are accommodated by the separation of the slit and selection of securement of said closures along said slit.

2. The cover of claim 1 wherein said slit has opposite ends and extends approximately half the distance between said open and closed ends, said spaced closures being two in number and generally equally spaced from said opposite slit ends and from each other.

3. The cover of claim 2 wherein said closures are chosen from the group of closures consisting of hook and loop, hook, button snap, zipper and tie closures.

4. The cover of claim 3 wherein said cover comprises two sides, each having a peripheral boundary of the same size and shape, said two sides being stitched along said boundary.

5. The cover of claim 4 wherein one of said sides comprises two portions which are identically sized, stitched together.

6. The cover of claim 5 further comprising a padding between said stitched portions.

7. The cover of claim 3 wherein a boundary of one of said sides has two portions which are generally straight and spaced apart and generally parallel, a third portion being radiused and extending between said straight and parallel portions, and a fourth boundary being generally straight and extending between said straight and parallel portions, said straight and parallel portions spacing said third and fourth boundary apart.

8. The cover of claim 1 wherein said slit defines a slit portion and an unslit portion of said cover, said slit portion being adjacent said open end, said unslit portion being adjacent said closed end, said unslit portion being partially covered by padding.

9. The cover of claim 8 wherein said padding extends over the unslit portion of one of said sides.

10. The cover of claim 8 wherein said unslit portion is less flexible than said slit portion, said unslit portion biasing said slit into a closed position.

11. The cover of claim 1 wherein said cover comprises two sides, each having a peripheral boundary of the same size and shape, said sides being stitched along said boundaries.

12. The cover of claim 11 wherein said boundaries each having two portions which are generally straight and spaced apart and generally parallel, a third portion being radiused and extending between said straight and parallel portions, and fourth boundary being straight and extending between said generally straight and parallel portions, said straight and parallel portions spacing said third and fourth boundaries apart.

13. The cover of claim 1 wherein said closed end is radiused in the plane defined by said flexible material.

14. The cover of claim 1 wherein said cover adjacent said open end is more flexible than said cover adjacent said closed end.

* * * * *